Patented Dec. 10, 1935

2,023,997

UNITED STATES PATENT OFFICE

2,023,997

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application December 31, 1934, Serial No. 760,034

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent used in our process consists of an oxyoctadecadiene-9,11-acid-1 material, and particularly a material of the kind in which an oxyoctadecadiene-9,11-acid-1 body has entered into an esterification reaction in the capacity of an alcohol. The most desirable reagents are those obtained by reaction of an oxyoctadecadiene-9,11-acid-1 body and a detergent-forming acid of the kind subsequently described, or else, with a polybasic carboxy acid.

Various products can be obtained by the decomposition of castor oil or ricinoleic acid under various conditions of temperature, pressure, state of division, etc. At lower temperatures some of the common products obtained are hendecenoic acid and heptoic aldehyde. At higher temperature it is possible to obtain octadecadiene-9,11-acid-1, which is described as $C_{18}H_{32}O_2$ of the formula:

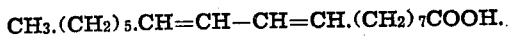

As stated in U. S. Patent No. 1,920,585, to Ott and Schussler, dated August 1, 1933, it is obtainable by splitting off water from ricinoleic acid $(C_{18}H_{34}O_3)$ of the formula:

It is interesting to note that the splitting of water from ricinoleic acid results in the formation of conjugated double bonds. It is also interesting to note that long chain compounds possessing conjugated double bonds, such as tung oil, polymerize readily, and this is also true of the residue obtained by heat treatment of castor oil or ricinoleic acid in a manner so that the pyrolytic decomposition yields water. Since such residues are presumably high in the percentage content of octadecadiene-9,11-acid-1 acid, it appears perfectly reasonable that such polymerization should be expected to take place. Incidentally, in referring to products derived from octadecadiene-9,11-acid-1, it is not necessary to start with a pure acid, but the product obtained from castor oil, by splitting off water, can be used with or without saponification, and with or without a certain amount of undecomposed castor oil or other materials present.

We have found that certain oil field emulsions are particularly susceptible to treatment with oxyoctadecadiene-9,11-acid-1 bodies. This is particularly true of the esters in the form previously mentioned. In such instances where the use of oxyoctadecadiene-9,11-acid-1 bodies is indicated for demulsification, it is desirable to produce these materials by an oxidation of octadecadiene-9,11-acid-1 or octadecadiene-9,11-acid-1 bodies, such as a glyceride. Oxidation by air appears to be most feasible and at the same time inexpensive.

Octadecadiene-9,11-acid-1 of suitable purity may be subjected to oxidation by any of the methods conventionally employed for oxidation of castor oil and the like. Our preference is to oxidize octadecadiene-9,11-acid-1 at a relatively low temperature by means of moist air under pressure. We prefer to use a temperature of 125 to 135° C., and to use approximately 45 to 75 lbs. pressure. If desired, octadecadiene-9,11-acid-1 may be oxidized at a higher temperature by means of air or oxygen at atmospheric pressure. Furthermore, it may be oxidized in the presence of an inert material, if more convenient to reduce the viscosity during oxidation by means of such added material.

We have referred to the product obtained by oxidizing octadecadiene-9,11-acid-1 as "oxyoctadecadiene-9,11-acid-1". The expression "oxyoctadecadiene-9,11-acid-1" is intended is refer to the derivatives in which additional oxygen has been introduced into the molecule, for instance, as indicated by the formula $C_{18}H_{32}O_3$. This represents the saturation of an ethylene linkage, or perhaps the partial saturation of two ethylene linkages, or the formation of a new ethylene linkage by means of an added oxygen atom. We do not know exactly the composition of the product obtained by the initial oxidation of octadecadiene-9,11-acid-1. The reaction or reactions presumably are comparable to the saturation of conjugated double bonds by halogens or similar reagents. Under such circumstances a new ethylene linkage may be created. See "Text Book of Organic Chemistry", by Bernthsen, 1931 edition, page 840. It is believed that oxidation, especially with moist air, results in the conversion of this added oxygen into two hydroxyl radicals, so that one ultimately obtains hydroxylated octadecadiene-9,11-acid-1, as indicated by the formula $C_{18}H_{32}(OH)_2O_2$. In other words, the addition product of octadecadiene-9,11-acid-1 is the substitution product, at least hypothetically, of the corresponding semi-saturated acid of the composition $C_{18}H_{34}O_2$, i. e., apparently dihydroxy iso-oleic acid. Complete hydroxylation would apparently form tetrahydroxystearic acid.

It appears immaterial whether an oxygen atom is introduced or two hydroxyl radicals are introduced. This is perfectly evident, in view of esterification reactions in which the oxyoctadecadiene-9,11-acid-1 is acting as a dihydric alcohol. For instance, if one considers a reaction with a dibasic carboxy acid, for instance, phthalic acid, it is immaterial whether the two carboxyls react with two hydroxyl radicals, thus causing the elimination of two molecules of water, or if the two carboxyls react with an atom of oxygen in an ether-type structure with the elimination of only one molecule of water. This is comparable to esterification involving an acid anhydride, such as acetic anhydride or phthalic anhydride, instead of the corresponding acid. However, the reactions involving a monobasic acid, such as oleic acid, acetic acid or ricinoleic acid, appear to be predicated most simply on the existence of an alcoholiform hydroxyl radical. In any event, the presence of the hydroxyl radical is proven by the acetyl value, and it is desired to point out that it is immaterial as to the final form of the oxidized octadecadiene-9,11-acid-1 body, and that the expression "oxyoctadecadiene-9,11-acid-1 body" is intended to broadly cover both types of materials, and that the expression "hydroxylated octadecadiene-9,11-acid-1 body" will be intended to indicate the hydroxylated type, although, strictly speaking, from the standpoint of the most widely accepted nomenclature, this product might better be defined as a substitution product of the semi-saturated $C_{18}H_{34}O_2$ acid, possibly dihydroxy iso-oleic acid, as previously noted.

After producing such oxyoctadecadiene-9,11-acid-1 bodies, as previously related, they may be used in the acid condition or neutralized with any suitable base, so as to produce an ammonium salt, a sodium salt, potassium salt, calcium salt, magnesium salt, etc., or they may be esterified with any suitable alcohol, such as ethyl alcohol, methyl alcohol, etc. so as to produce an ester. Such oxyoctadecadiene-9,11-acid-1 may be combined with basic amines, such as triethanolamine.

However, we have found that the most effective reagents of this type and the ones which we prefer to use in our present process, are the species derived from oxyoctadecadiene-9,11-acid-1 by reactions involving the oxyoctadecadiene-9,11-acid-1 body acting as an alcohol, and in certain instances, as a dihydric alcohol. It is well known, of course, that ricinoleic acid or hydroxystearic acid may act as an alcohol, as well as an acid. Similarly, dihydroxystearic acid may act as an alcohol, as well as an acid, and as indicated by its name, may act as a dihydric alcohol. We prefer to react oxyoctadecadiene-9,11-acid-1 or its salt or ester with acids such as acetic, etc., and particularly with various long chain mono-carboxy acids, particularly the type which, when combined with caustic soda, yields detergent-like materials. For instance, it is well known that the ordinary fatty acids, such as oleic acid, stearic acid, ricinoleic acid, etc. combine with alkali, such as caustic soda, to yield soaps. It is also true that certain petroleum acids, such as naphthenic acids, combine with alkalies to yield soap-like materials. The same is true of abietic acid derived from resin. These three classes of materials are often referred to as detergent-forming long chain mono-carboxy acids. In order to prepare some of the most desirable reagents to be employed in the present process, we prefer to react oxyoctadecadiene-9,11-acid-1 or its salts or esters with such detergent-forming acids, so as to produce an ester in which the oxyoctadecadiene-9,11-acid-1 has acted as an alcohol. If desired, two moles of octadecadiene-9,11-acid-1 may be heated, so as to yield an ester acid, i. e., poly oxyoctadecadiene-9,11-acid-1. Various materials, acidic in nature and obtained by oxidation of fatty acids or fatty oils may be employed for the same purpose. It is immaterial as to the particular detergent acid or fatty acid or fatty body united with the oxyoctadecadiene-9,11-acid-1, provided that it is a relatively long chain mono-carboxy acid of the type which combines with caustic soda or the like to give detergent-like materials. Diricinoleic acid may be employed. Polyricinoleic acid may be employed, etc.

In forming esters from oxyoctadecadiene-9,11-acid-1 bodies in such a manner that the octadecadiene-9,11-acid-1 body acts as an alcohol, one finds that a subspecies of this type, which is also very effective for use in the present process, is obtained by reactions involving dibasic carboxy acids, such as phthalic acid, oxalic acid, maleic acid, succinic acid, fumaric acid, citric, adipic, sebacic, tartaric, glutaric, diphenic, naphthalic, etc. Reference is made to U. S. Patent No. 1,976,602, to De Groote, Adams and Keiser, dated October 9, 1934. This patent describes the manufacture of various reagents intended for demulsification from castor oil or similar hydroxylated acid bodies, in which the hydroxylated acid acts as an alcohol by virture of the alcoholiform hydroxyl and an ester is produced by reaction with at least one of the dibasic carboxy acids previously mentioned.

Similarly, reference is made to U. S. Patent No. 1,977,146, to Roberts, dated October 16, 1934. In this last mentioned patent there are described reagents for breaking oil field emulsions which are similar to the reagents disclosed in the previously described De Groote et al. patent, except that in the Roberts' patent the dibasic carboxy acids are additionally esterified with polyhydric alcohols, such as glycerol, to give a resin type structure. It is perfectly obvious that oxyoctadecadiene-9,11-acid-1 bodies may be caused to enter esterification reactions of the kind described in both of the above mentioned patents, in respect to castor oil or ricinoleic acid bodies. In other words, the oxyoctadecadiene-9,11-acid-1 body acts in an analogous manner to ricinoleic acid or castor oil. We have found this particular type of reaction to yield the most effective demulsifying agent for use in the present process.

In order to summarize what has been said previously, one may consider octadecadiene-9,11-acid-1 as being:

The octadecadiene acid residue

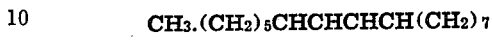

may be designated, for sake of convenience, as T, and thus the acid may be considered as T.COOH, and the oxy acid may be considered as Y.T.COOH, wherein Y is at least one oxygen atom or at least one hydroxyl radical, COO is a conventional carboxyl residue, and T.COO is the octadecadiene 9,11-acid-1 radical. Y.T.COOH is an alcoholic type acid in the same sense that ricinoleic acid is an alcoholic acid. Y.T.COOH may be converted into a salt or ester and thus be rewritten Y.T.COOZ, wherein Z represents an acidic hydrogen atom or its equivalent in the case of a salt or ester.

Similarly, reactions of the oxy acid may involve Y, as previously stated, forming compounds of the type R.T.COOZ, wherein R is an acid residue.

Thus, the expression "oxyoctadecadiene-9,11-acid-1 material" refers to compounds of the type Y.T.COOZ, or the type R.T.COOZ, and in both instances, are characterized by the presence of the octadecadiene-9,11-acid-1 residue T.

Those reactions which involve Y.T.COOH acting as an acid means that the acidic hydrogen H will be replaced by a metallic atom or by an organic radical, and of course, will be contemplated by the formula Y.T.COOZ, as previously described.

In regard to those reactions in which Y.T.COOZ acts as an alcohol, Y is replaced by an acid residue, such as a phthalic acid residue or the like. All the various materials may be considered of the type X.T.COOZ, wherein X represents at least one oxygen atom or one hydroxyl radical, or an acid residue, T represents an octadecadiene-9,11-acid-1 residue, COO is the conventional carboxyl residue, and Z is an acidic hydrogen atom, or its equivalent.

We prepare our preferred reagent in the following manner: oxyoctadecadiene-9,11-acid-1 or the glyceride thereof is derived from castor oil. This product has a molecular weight of approximately 315 to 350, calculated on the basic of a single acid radical. 296 lbs. of phthalic anhydride are mixed with 92 lbs. of glycerol and heated for approximately 10 to 15 minutes at 125 to 150° C., until a thin, clear, water-white resin intermediate free from any unreacted phthalic anhydride has been produced. This product is characterized by having a free carboxylic radical available for further esterification. To this liquid resin intermediate free from unreacted-on phthalic anhydride there is added 350 lbs. of hydroxylated octadecadiene-9,11-acid-1, and the mixture is heated from approximately 150 to 250° C. for approximately 10 to 30 minutes, after which it is permitted to cool and is diluted with 10 to 50% by weight of denatured alcohol. The compound is then ready for use, and any free carboxylic hydrogen remaining may be neutralized by the addition of triethanolamine.

The use of demulsifying agents consisting of various carboxy acids or compounds having more than one carboxyl group, is well known in the treatment of water-in-oil emulsions. In the use of conventional demulsifying agents, it is the common practice to use them not only in the form of acids, but also in the form of salts or esters, or half salts, or half esters, or ester salts, in case of dibasic acids. Where such reagents have both a carboxylic hydrogen and a sulfonic hydrogen, it is well known that only the sulfonic hydrogen need be neutralized, if desired. The salts generally employed are the sodium salt, potassium salt, ammonium salt, calcium, magnesium, the triethanolamine salt, etc. The esters may be employed, such as the methyl ester, ethyl ester, propyl ester, butyl ester, amyl ester, hexyl ester, octyl ester, etc. Aromatic or cyclic esters may be employed. What has been said in regard to the use of conventional demulsifying agents applies also to the materials employed as the demulsifying agent of our process.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthraceneoil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or 1 to 30,000, such an apparent insolubility in oil and water is not significant, because said reagents undoubtedly have solubility within the concentration employed. This same fact is true in regard to the material or materials employed as the demulsifying agent of our process.

As stated previously, it has been so common to use a conventional demulsifying agent derived from an acid in the form of the acid itself, or in the form of a salt, or in the form of an ester, that the expression "acid body" is frequently employed to mean the acid itself, or an ester thereof, or a salt thereof. The word "body" is herein employed in this same sense in conformity with its prior usage in the trade, and also to include esters obtained by the oxyoctadecadiene-9,11-acid-1 material acting in the capacity of an alcohol.

It is to be noted that the present invention is concerned with the breaking of oil field emulsions by means of a reagent characterized by the presence of an oxyoctadecadiene-9,11-acid-1 radical or residue. In certain cases this radical residue may be specifically a hydroxy or dihydroxy derivative of octadecadiene-9,11-acid-1. Oxyoctadecadiene-9,11-acid- bodies are characterized, as stated, by the presence of an oxyoctadecadiene-9,11-acid-1 radical or residue. These bodies consist of either the acid itself or its derivatives. The words "oxyoctadecadiene-9,11-acid- bodies" are used in the sense that contemplates both the acid itself and its derivatives. The derivatives of oxyoctadecadiene-9,11-acid- are of two kinds, i. e., the type in which oxyoctadecadiene-9,11-acid-1 acts as an acid to form a salt or simple ester, and secondly, the type in which the oxyoctadecadiene-9,11-acid-1 acts as an alcohol to form a more complete ester. Of course, the acid may also act in a dual capacity. This last mentioned species in which oxyoctadecadiene-9,11-acid-1 acts as an alcohol may be divided into numerous subspecies. The two most valuable subspecies for use as a reagent in breaking oil field emulsions consists of the types in which oxyoctadecadiene-9,11-acid-1 has acted as an alcohol in combination with a mono-carboxy detergent-forming acid of the kind described, or where oxyoctadecadiene-9,11-acid-1 has acted as an alcohol in combination with a polybasic carboxy acid of the kind described. It is understood that in a general manner the reagents may be used in the form of acids, salts, or esters, or in any convenient form.

In practising our invention a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described our invention, what we claim as new and desire to secure by Letters Patent is:

1. A process for breaking a petroleum emulsion of the water-in-oil type, which consists in subjecting the emulsion to the action of a demulsifying agent comprising an oxyoctadecadiene-9,11-acid-1 material, of the formula type X.T.COO.Z, wherein X is at least one oxygen atom, or at least, one hydroxyl radical, or an acid residue, T is an octadecadiene-9,11-acid-1 residue, COO is a conventional carboxyl residue, and Z is an acidic hydrogen equivalent.

2. A process for breaking a petroleum emulsion of the water-in-oil type, which consists in subjecting the emulsion to the action of a demulsifying agent obtained by a reaction involving oxyoctadecadiene-9,11-acid-1 acting as an acid, of the formula type X.T.COO.Z, wherein X is at least one oxygen atom, or at least, one hydroxyl radical, or an acid residue, T is an octadecadiene-9,11-acid-1 residue, COO is a conventional carboxyl residue, and Z is a metallic atom or organic radical.

3. A process for breaking a petroleum emulsion of the water-in-oil type, which consists in subjecting the emulsion to the action of a demulsifying agent obtained by a reaction involving oxyoctadecadiene-9,11-acid-1 body acting as an alcohol, of the formula type X.T.COO.Z, wherein X is an acid residue, T is an octadecadiene-9,11-acid-1 residue, COO is a conventional carboxyl residue, and Z is an acidic hydrogen equivalent.

4. A process for breaking a petroleum emulsion of the water-in-oil type, which consists in subjecting the emulsion to the action of a demulsifying agent obtained by a reaction between a detergent-forming, mono-carboxy acid and an oxyoctadecadiene-9,11-acid-1 body acting as an alcohol.

5. A process for breaking a petroleum emulsion of the water-in-oil type, which consists in subjecting the emulsion to the action of a demulsifying agent obtained by reaction between a ricinoleic acid body and an oxyoctadecadiene-9,11-acid-1 body acting as an alcohol.

6. A process for breaking a petroleum emulsion of the water-in-oil type, which consists in subjecting the emulsion to the action of a demulsifying agent comprising a product obtained by reaction between a polybasic carboxy acid and an oxyoctadecadiene-9,11-acid-1 body acting as an alcohol.

7. A process for breaking a petroleum emulsion of the water-in-oil type, which consists in subjecting the emulsion to the action of a demulsifying agent comprising a product obtained by partial esterification of a polybasic carboxy acid with a polyhydric alcohol and subsequent esterification of the residual carboxylic hydrogen with an oxyoctadecadiene-9,11-acid-1 body acting as an alcohol.

8. A process for breaking a petroleum emulsion of the water-in-oil type, which consists in subjecting the emulsion to the action of a demulsifying agent comprising a product obtained by reaction between an acidic glycerol phthalic anhydride resin intermediate and an oxyoctadecadiene-9,11-acid-1 body.

9. A process for breaking a petroleum emulsion of the water-in-oil type, which consists in subjecting the emulsion to the action of a demulsifying agent comprising a product obtained by reacting 92 lbs. glycerol with 296 lbs. phthalic anhydride so as to yield a clear, acidic resin intermediate, followed by reaction with 350 lbs. hydroxylated octadecadiene-9,11-acid-1 and then followed by subsequent dilution with denatured alcohol.

MELVIN DE GROOTE.
BERNHARD KEISER.